United States Patent [19]

Sonnenberg et al.

[11] Patent Number: 4,994,499
[45] Date of Patent: Feb. 19, 1991

[54] METHOD OF ADDING FLAME RETARDANT TO VINYL AROMATIC POLYMERS MADE IN A ONE-STEP PROCESS

[75] Inventors: Fred M. Sonnenberg, Merion; Dennis M. Hajnik, West Chester, both of Pa.

[73] Assignee: Arco Chemical Technology, Inc., Wilmington, Del.

[21] Appl. No.: 560,946

[22] Filed: Jul. 31, 1990

[51] Int. Cl.$^5$ .............................. C08J 9/18; C08J 9/20
[52] U.S. Cl. ...................................... 521/56; 521/60; 521/88; 521/90; 521/97; 521/907
[58] Field of Search ...................... 521/56, 60, 88, 90, 521/97

[56] References Cited

U.S. PATENT DOCUMENTS

| | | | |
|---|---|---|---|
| 3,093,599 | 6/1963 | Mueller-Tanan et al. | 260/2.5 |
| 3,192,169 | 6/1965 | Doak | 521/56 |
| 3,503,905 | 3/1970 | Zuern et al. | 260/2.5 |
| 3,647,723 | 3/1972 | Mysik et al. | 521/56 |
| 3,696,060 | 10/1972 | Burt | 521/56 |
| 3,755,209 | 8/1973 | Nintz et al. | 521/88 |
| 3,956,203 | 5/1976 | Burger et al. | 260/2.5 B |
| 3,975,327 | 8/1976 | Nintz et al. | 521/98 |
| 4,028,285 | 6/1977 | Pillar | 521/98 |
| 4,113,672 | 9/1978 | Pillar | 521/147 |
| 4,281,067 | 7/1981 | Kienzle et al. | 521/146 |
| 4,286,071 | 8/1981 | Rigler et al. | 521/96 |
| 4,520,136 | 5/1985 | Schwarz | 521/60 |
| 4,761,432 | 8/1988 | Sonnenberg et al. | 521/60 |

*Primary Examiner*—Morton Foelak
*Attorney, Agent, or Firm*—Jonathan L. Schuchardt

[57] ABSTRACT

A method of introducing flame retardants into expandable vinyl aromatic polymer beads made in a one-step process is disclosed. Flame retardants with good solubility in blowing agents are introduced after monomer conversion is substantially complete, resulting in vinyl aromatic polymer beads with low residual monomer content.

20 Claims, No Drawings

METHOD OF ADDING FLAME RETARDANT TO VINYL AROMATIC POLYMERS MADE IN A ONE-STEP PROCESS

FIELD OF THE INVENTION

The invention relates to the preparation of flame-retardant vinyl aromatic polymers. More specifically, a method of adding flame retardants to vinyl aromatic polymer beads produced in a one-step suspension polymerization process is disclosed. The polymer beads can be expanded to form cellular, molded, flame-retardant articles.

BACKGROUND OF THE INVENTION

Foamed thermoplastic polymers enjoy widespread use in building construction due to their low density and excellent insulating properties. For these uses, flame-resistant, self-extinguishing foams are desirable. Many halogenated organic compounds have been proposed as additives for improving flame resistance. Some of these flame retardants would be effective and economical, but are not widely used because they inhibit monomer polymerization or impart severe heat sensitivity to the pre-expanded products.

The manufacture of molded articles from expanded thermoplastic polymer particles such as expandable polystyrene beads (EPS) is well known. Two methods are commonly used for preparing molded products from vinyl aromatic monomers. In one method, called herein "the two-step process," the vinyl aromatic monomer, typically styrene, is suspension polymerized to form hard polymer beads, which are isolated and screened to the desired size distribution. The sieved beads are then resuspended in water, impregnated with a blowing agent—optionally in the presence of a flame retardant, pre-expanded with steam, aged, and molded. This process is illustrated by the teachings of U.S. Pat. Nos. 4,028,285 and 4,113,672.

In another method, called herein the "one-step process," the vinyl aromatic polymer is suspension polymerized—often in the presence of a flame retardant—and the beads are impregnated with a blowing agent and cured without isolation or screening of the beads as in the two-step process. The one-step process for making expandable beads is illustrated by the teachings of U.S. Pat. Nos. 4,286,071, 3,975,327, 3,755,209, and 4,281,067. While the one-step method is simpler, the beads produced tend to have a wider size distribution, which limits the number of suitable applications for beads made in this way.

Flame retardants are typically incorporated into vinyl aromatic polymer beads either during polymerization or impregnation. These methods are summarized by P. L. Ku in "Fire Retardants for Readily Combustible Cellular Polystyrene," Adv. Polm. Tech. 9 (1989) on pages 63, 66 and 67. 1,2,5,6,9,10-hexabromocyclododecane (HBCD) is by far the most commonly used flame retardant for either process. In the one-step process, the flame retardant is included at the start of the polymerization. In the two step process, the flame retardant is added either initially, or during impregnation of the hard beads with blowing agent.

A disadvantage of adding the flame retardant before polymerization in the one-step process is that the flame retardant must be compatible with the suspension polymerization mixture. If the flame retardant inhibits polymerization of the vinyl aromatic monomer or renders the expandable beads heat sensitive, molding of satisfactory products may not be possible. This limits the number of flame retardants useful in the one-step process. Another disadvantage of the conventional method for adding flame retardant early in the one-step process is the need to include additional reagents in the polymerization mixture such as peroxide synergists or acid scavengers. New methods of adding flame retardant in the one-step process are needed as alternatives to the conventional approach of adding flame retardant into the polymerization mixture. Methods are needed that allow one to add otherwise desirable flame retardants that are not currently useable because of their tendency to inhibit vinyl aromatic monomer polymerization. Methods that reduce the number of required components in the polymerization mixture and thus allow simpler, less expensive formulations are also desirable.

SUMMARY OF THE INVENTION

This invention provides a novel method for incorporating flame retardants into expandable thermoplastic polymer beads prepared in a one-step suspension polymerization process. The process of the invention yields flame-retardant polymer beads that have low residual vinyl aromatic monomer content.

The process comprises: (1) polymerizing an aqueous suspension of a vinyl aromatic monomer to a percent conversion between about 50 and 80 percent to form polymer beads having a density greater than about 1; (2) impregnating the polymer beads with a portion of blowing agent; (3) heating the beads to a temperature sufficient to polymerize the remaining aromatic monomer; and (4) impregnating the beads with a solution of the balance of the blowing agent and a flame retardant that is soluble in the blowing agent.

An alternative and particularly preferred process of the invention comprises: (1) polymerizing an aqueous suspension of a vinyl aromatic monomer as above; (2) heating the beads to a temperature sufficient to polymerize the remaining vinyl aromatic monomer; and (3) impregnating the beads with a solution of a blowing agent and a flame retardant that is soluble in the blowing agent.

In either process, it is important to add the flame retardant after the polymer beads have cured; the residual aromatic vinyl monomer content of the final beads can be maintained at a desirably low level (usually less than about 1500 to 2000 ppm) only if the flame retardant is added after curing the beads. It is also important that the flame retardant be somewhat soluble in conventional blowing agents such as pentane.

DETAILED DESCRIPTION OF THE INVENTION

The thermoplastic polymer beads of the invention are derived from one or more vinyl aromatic monomers. Examples of suitable monomers include, but are not limited to, styrene, isopropylstyrene, alpha-methylstyrene, nuclear methylstyrenes, chlorostyrene, tert-butylstyrene, divinylbenzene, and the like, and mixtures thereof. Preferably, the vinyl aromatic monomer is styrene.

The polymer beads are formed by polymerizing an aqueous suspension containing a vinyl aromatic monomer such as styrene, one or more suspending agents such as hydroxyethyl cellulose and tricalcium phosphate, one or more free-radical initiators such as benzoyl peroxide, one or more finishing agents such as tert-butyl perbenzoate, waxes such as polyethylene, and acid scavengers such as dibutyltin maleate, among other possible additives.

In prior-art methods, a flame retardant compatible with the vinyl aromatic monomer such as hexabromocyclododecane is also included in the polymerization mixture. Other conceptually desirable flame retardants cannot be added initially like HBCD. An example is 2,4,6-tribromophenyl allyl ether "FR-913" ("FR-913" is a product of AmeriBrom, Inc., New York, N.Y.). Addition of "FR-913" at the beginning of the polymerization results in polymer products having unacceptably high residual monomer contents, presumably because "FR-913" acts as a chain-transfer agent and inhibits monomer polymerization. In order to overcome this problem, we have explored alternative methods for incorporating flame retardants such as "FR-913" into vinyl aromatic polymers. In accordance with the present invention, addition of the flame retardant is delayed until late in the one-step process.

Polymerization of the vinyl aromatic monomer is carried out at a temperature within the range of about 30° C. to 100° C., preferably from about 85° C. to 95° C. After a period of about 1 to 5 hours, usually about 3 hours, when the conversion of the aromatic monomer is about 50 to 80 percent complete, the density of the beads increases to greater than about 1, and the "soft" beads begin to sink. Preferably, conversion of the aromatic monomer is controlled within the range of about 65 to 75 percent.

In accordance with one embodiment of the present invention, the polymer beads are next impregnated with a portion of the blowing agent. This portion is preferably about 30 to 70 percent of the total amount of blowing agent to be used. More preferably, the portion is about 45 to 55 percent of the total amount. The impregnated beads are then heated at a temperature sufficient to polymerize the remaining vinyl aromatic monomer. Preferably, the mixture is heated during this cure cycle at a temperature within the range of about 90° C. to 130° C. More preferably, the temperature is within the range of about 110° C. to 125° C. The time period for the heating step will depend upon a number of factors, most importantly temperature. Typically, the heating is continued for a period of time within the range of from about 2 to 10 hours. Preferably, the time period is about 5 to 7 hours. Following the cure cycle, the beads are impregnated with a solution of the remaining portion (30 to 70%) of the blowing agent and the desired flame retardant. It is especially desirable to add the flame-retardant solution as late as possible in the process; i.e., low residual vinyl aromatic monomer contents will be achieved most easily when monomer conversion is substantially complete prior to addition of the flame-retardant solution.

In an alternative and particularly preferred embodiment of the invention, the vinyl aromatic monomer is polymerized in an aqueous suspension as described above until the percent conversion of monomer is within the range of about 50 and 80 percent, preferably within the range of about 65 and 75 percent. The soft beads are then heated at a temperature sufficient to polymerize the remaining vinyl aromatic monomer. Preferably, the cure step is carried out at a temperature within the range of about 90° C. to 130° C. More preferably the range is 110° C. to 125° C. The period of time for the cure is as described above. Following the cure cycle, the beads are impregnated with a solution of flame retardant in the total amount of blowing agent to be used.

Following impregnation in accordance with either embodiment of the invention, the beads are typically heated for a period of time within the range of about 30 minutes to 2 hours, preferably for about 1 hour, at a temperature within the range of about 90° C. and 130° C., preferably within the range of about 110° C. to 125° C. for the purpose of completing the impregnation.

The impregnated beads so produced have a long shelf life and can either be stored for later use or can be pre-expanded with steam to give expanded beads, aged, and molded into the desired flame-retardant articles.

In a particularly preferred embodiment of the invention, the vinyl aromatic monomer is styrene. The suspension polymerization is carried out to a conversion within the range of about 65 to 75 percent. The resulting soft beads are then heated to a temperature within the range of about 110° to 125° C. for about 5 to 7 hours to cure the beads. The beads are then impregnated with a pentane solution of 2,4,6-tribromophenyl allyl ether, and heated for about 1 hour at 100° to 125° C. to complete the impregnation.

Blowing agents useful in the process of the invention include one or more aliphatic hydrocarbons having from 4 to 6 carbon atoms. Examples of suitable blowing agents include pentane, isopentane, cyclopentane, butane, hexanes, cyclohexane, and the like, and mixtures thereof. Pentane is particularly preferred.

Flame retardants useful in the process of the invention are limited to those having a solubility in the blowing agent of at least about 0.5 weight percent, preferably at least about 1.0 weight percent. Preferred flame retardants include polybrominated aliphatic and cycloaliphatic hydrocarbons having from 4 to 20 carbon atoms, and compounds having polybrominated aromatic rings. Examples of suitable flame retardants include 1,2-dibromo-4-(1,2-dibromoethyl)cyclohexane, tetrabromobisphenol A bis(allyl ether), bis(2-ethyl-1-hexyl)-2,3,4,5-tetrabromophthalate, 2,3,4,5,6-pentabromophenyl allyl ether, and 2,4,6-tribromophenyl allyl ether. Particularly preferred is 2,4,6-tribromophenyl allyl ether.

Interestingly, the residual styrene content of the final beads is highly dependent upon when the flame retardant is added in the process. If the flame retardant solution is added before the polymer beads are sufficiently cured, the beads will have a detrimentally high level of residual styrene present. We have found that flame retardants with sufficient solubility in blowing agents may be advantageously added following curing in the one-step process to give beads with surprisingly low residual vinyl aromatic monomer content.

The following examples are meant to illustrate the invention without limiting scope. One skilled in the art will recognize various modifications possible that are within the spirit of the invention.

EXAMPLE 1

To a one-half gallon stirred glass reactor was added water (566 g) followed by hydroxyethyl cellulose (0.562 g). The mixture was stirred for 30 min. at 30° C. Tricalcium phosphate (4.95 g) was added, followed by a solution of benzoyl peroxide (1.531 g) and tert-butyl perbenzoate (0.547 g) in styrene (450 g). A second mixture was prepared from ethylene vinyl acetate copolymer (0.135 g) and styrene (100 g) that was preheated to about 70°

C. The second styrene solution was added to the reactor, and the mixture was heated to 90° C. over a period of 1.5 h, then held at 90° C. for 5.5 h. After settling of the beads occurred (about 215 min. at 90° C.), polyvinyl alcohol (0.553 g) in water (100 g) was added. The reactor was then pressurized to 50 psi with nitrogen, and n-pentane (22.5 g) was added over a period of 90 min. The reactor was then heated to 118° C. over 30 min., and held at 118° C. for 6 h. A solution of 2,4,6-tribromophenyl allyl ether ("FR-913") (3.49 g) in pentane (22.5 g) was added to the mixture over 30 min. The reaction mixture was heated for 1 additional hour at 118° C. Upon cooling, the beads were centrifuged and washed with water.

EXAMPLE 2

The procedure of Example 1 was followed with the following modifications. The "FR-913" flame retardant was dissolved in all of the pentane to be used (45 g), and this solution was added to the reaction mixture over a one-hour period following the 6-hour curing step at 118° C. The mixture was heated for an additional hour at 118° C. prior to cooling, centrifugation, and washing of the beads with water.

COMPARATIVE EXAMPLE 3

The procedure of Example 1 was followed with the following modifications. Dicumyl peroxide (1.097 g) was included in the first styrene solution with benzoyl peroxide and tert-butyl perbenzoate. 1,2,5,6,9,10-hexabromocyclododecane (HBCD) (3.49 g) was included in the second styrene solution with the ethylene vinyl acetate copolymer. Dibutyltin maleate (0.077 g) was added to the reactor immediately following addition of the second styrene solution. All of the pentane was added prior to the heating step at 118° C. "FR-913" was omitted from the formulation.

COMPARATIVE EXAMPLE 4

The procedure of Comparative Example 3 was followed except that "FR-913" (3.49 g) was used in place of hexabromocyclododecane. In addition, dicumyl peroxide and dibutyltin maleate were omitted from the formulation.

COMPARATIVE EXAMPLE 5

The procedure of Comparative Example 3 was followed except that "FR-913" (3.49 g) was used in place of HBCD. The flame retardant was dissolved in pentane (45 g) at room temperature, and was added to the reaction mixture over 90 min. following addition of the polyvinyl alcohol solution. Dicumyl peroxide and dibutyltin maleate were omitted from the formulation.

TABLE 1

| Effect of Method of Flame Retardant Addition | |
|---|---|
| Example # | Residual Styrene (ppm) |
| 1 | 520 |
| 2 | 210 |
| 3 | 897 |
| 4 | 8000 |
| 5 | 9250 |

Comparative Example 3 illustrates the conventional method of adding flame retardant in a one-step process for producing polystyrene beads. The residual styrene level is about 900 ppm, which is acceptable. Comparative Example 4 shows how the residual styrene level is adversely affected by direct substitution of hexabromocyclododecane with "FR-913". Comparative Example 5 shows that addition of the flame retardant after only polymerizing the styrene at 90° C. for 215 minutes still gives unacceptable levels of residual styrene in the final beads. This result underscores the importance of adding the flame retardant late in the polymerization to achieve low residual styrene contents.

Examples 1 and 2 illustrate the process of the invention. In each case, the residual styrene content is well below the acceptable level of Comparative Example 3. Surprisingly, addition of the flame retardant late in the polymerization results in acceptable levels of residual styrene, while unacceptable levels result if the flame retardant is added initially or even as late as 3.5 hours into the polymerization. The final residual styrene contents obtained in the process of the invention are significantly lower than those obtained with the conventional method.

We claim:

1. A process for preparing flame-retardant expandable thermoplastic beads with low residual vinyl aromatic monomer content comprising:
    (a) polymerizing an aqueous suspension of a vinyl aromatic monomer to a percent conversion within the range of about 50 and 80 percent to form polymer beads having a density greater than about 1;
    (b) impregnating the polymer beads with a blowing agent;
    (c) heating the polymer beads at a temperature sufficient to polymerize the remaining vinyl aromatic monomer; and
    (d) impregnating the polymer beads with a solution of the blowing agent and a flame retardant soluble in the blowing agent, wherein said process is a one-step suspension polymerization process.

2. The process of claim 1 wherein the vinyl aromatic monomer is selected from the group consisting of one or more of styrene, alpha-methylstyrene, styrene and alpha-methylstyrene derivatives having one or more linear or branched $C_1$-$C_{10}$ alkyl substituents on the aromatic ring, and divinylbenzene.

3. The process of claim 1 wherein the vinyl aromatic monomer is styrene.

4. The process of claim 1 wherein the blowing agent is selected from the group consisting of one or more aliphatic hydrocarbons having from 4 to 6 carbon atoms.

5. The process of claim 1 wherein the blowing agent is pentane.

6. The process of claim 1 wherein the flame retardant has a solubility in the blowing agent at room temperature of at least about 0.5 weight percent.

7. The process of claim 1 wherein the flame retardant is selected from the group consisting of 1,2-dibromo-4-(1,2-dibromoethyl)cyclohexane, tetrabromobisphenol A bis(allyl ether), bis(2-ethyl-hexyl)-2,3,4,5-tetrabromophthalate, 2,3,4,5,6-pentabromophenyl allyl ether, and 2,4,6-tribromophenyl allyl ether.

8. The process of claim 1 wherein the flame retardant is 2,4,6-tribromophenyl allyl ether.

9. The process of claim 1 wherein the heating step is performed at a temperature within the range of about 90° C. to 130° C.

10. A process for preparing flame-retardant expandable thermoplastic beads with low residual vinyl aromatic monomer content comprising:

(a) polymerizing an aqueous suspension of a vinyl aromatic monomer to a percent conversion within the range of about 50 and 80 percent to form polymer beads having a density greater than about 1;

(b) heating the polymer beads at a temperature sufficient to polymerize the remaining vinyl aromatic monomer; and (c) impregnating the polymer beads with a solution of a blowing agent and a flame retardant soluble in the blowing agent, wherein said process is a one-step suspension polymerization process.

11. The process of claim 10 wherein the vinyl aromatic monomer is selected from the group consisting of one or more of styrene, alpha-methylstyrene, styrene and alpha-methylstyrene derivatives having one or more linear or branched $C_1$–$C_{10}$ alkyl substituents on the aromatic ring, and divinylbenzene.

12. The process of claim 11 wherein the vinyl aromatic monomer is styrene.

13. The process of claim 10 wherein the blowing agent is selected from the group consisting of one or more aliphatic hydrocarbons having from 4 to 6 carbon atoms.

14. The process of claim 10 wherein the blowing agent is pentane.

15. The process of claim 10 wherein the flame retardant has a solubility in the blowing agent at room temperature of at least about 0.5 weight percent.

16. The process of claim 10 wherein the flame retardant is selected from the group consisting of 1,2-dibromo-4-(1,2-dibromoethyl)cyclohexane, tetrabromobisphenol A bis(allyl ether), bis(2-ethyl-1-hexyl)-2,3,4,5-tetrabromophthalate, 2,3,4,5,6-pentabromophenyl allyl ether, and 2,4,6-tribromophenyl allyl ether.

17. The process of claim 10 wherein the heating step is performed at a temperature within the range of about 90° C. to 130° C.

18. A process for preparing flame-retardant expandable polystyrene beads with low residual styrene content comprising:

(a) polymerizing an aqueous suspension of styrene to a percent conversion within the range of about 65 and 75 percent to form polystyrene beads having a density greater than about 1;

(b) impregnating the beads with pentane;

(c) heating the polystyrene beads at a temperature between about 90° C. and 130° C. to cure the beads; and (d) impregnating the polystyrene beads with a pentane solution of a pentane-soluble flame retardant selected from the group consisting of 1,2-dibromo-4-(1,2-dibromoethyl)cyclohexane, tetrabromobisphenol A bis(allyl ether), bis(2-ethyl-1-hexyl)-2,3,4,5-tetrabromophthalate, 2,3,4,5,6-pentabromophenyl allyl ether, and 2,4,6-tribromophenyl allyl ether, wherein said process is a one-step suspension polymerization process.

19. A process for preparing flame-retardant expandable polystyrene beads with low residual styrene content comprising:

(a) polymerizing an aqueous suspension of styrene to a percent conversion within the range of about 65 to 75 percent to form polystyrene beads having a density greater than about 1;

(b) heating the polystyrene beads at a temperature between about 90° C. and 130° C. to cure the beads; and (c) impregnating the polystyrene beads with a pentane solution of a pentane-soluble flame retardant selected from the group consisting of 1,2-dibromo-4-(1,2-dibromoethyl)cyclohexane, tetrabromobisphenol A bis(allyl ether), bis(2-ethyl-1-hexyl)-2,3,4,5-tetrabromophthalate, 2,3,4,5,6-pentabromophenyl allyl ether, and 2,4,6-tribromophenyl allyl ether, wherein said process is a one-step suspension polymerization process.

20. A process for preparing flame-retardant expandable polystyrene beads with low residual styrene content comprising:

(a) polymerizing an aqueous suspension of styrene to a percent conversion within the range of about 65 to 75 percent to form polystyrene beads having a density greater than about 1;

(b) impregnating the polystyrene beads with a solution of pentane and at least about 1.0 wt. percent of 2,4,6-tribromophenyl allyl ether; and (c) heating the polystyrene beads at a temperature within the range of about 100° C. and 125° C. to polymerize the remaining styrene, wherein said process is a one-step suspension polymerization process.

* * * * *